United States Patent
Smith (10) Patent No.: US 11,621,912 B2
(45) Date of Patent: Apr. 4, 2023

(54) NETWORK CONGESTION REDUCTION USING BOOLEAN CONSTRAINED MULTIPATH ROUTING

(71) Applicant: The Regents of the University of California, Oakland, CA (US)

(72) Inventor: Bradley R. Smith, Santa Cruz, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 17/463,347

(22) Filed: Aug. 31, 2021

(65) Prior Publication Data

US 2022/0094628 A1  Mar. 24, 2022

Related U.S. Application Data

(63) Continuation of application No. 16/794,039, filed on Feb. 18, 2020, now Pat. No. 11,134,007, which is a continuation-in-part of application No. 16/745,990, filed on Jan. 17, 2020, now abandoned.

(60) Provisional application No. 62/793,507, filed on Jan. 17, 2019.

(51) Int. Cl.
| | | |
|---|---|---|
| H04L 45/24 | (2022.01) | |
| H04L 45/125 | (2022.01) | |
| H04L 47/125 | (2022.01) | |
| H04L 47/20 | (2022.01) | |
| H04L 45/50 | (2022.01) | |

(52) U.S. Cl.
CPC ............ *H04L 45/24* (2013.01); *H04L 45/125* (2013.01); *H04L 45/502* (2013.01); *H04L 47/125* (2013.01); *H04L 47/20* (2013.01)

(58) Field of Classification Search
CPC ....... H04L 45/24; H04L 45/12; H04L 45/125; H04L 45/502; H04L 47/125; H04L 47/20; H04L 45/123; H04L 45/124
See application file for complete search history.

(56) References Cited

U.S. PATENT DOCUMENTS

| | | | |
|---|---|---|---|
| 9,106,560 B2 * | 8/2015 | Alpert | .................. H04L 47/125 |
| 9,807,002 B2 * | 10/2017 | Segal | ...................... H04L 45/56 |
| 2013/0272126 A1 * | 10/2013 | Alpert | .................. H04L 41/145 |
| | | | 370/235 |
| 2019/0104054 A1 * | 4/2019 | McDonald | .............. H04L 45/24 |

* cited by examiner

*Primary Examiner* — Mohamed A Kamara
(74) *Attorney, Agent, or Firm* — Lumen Patent Firm (57) ABSTRACT

A packet routing method includes computing, for a source node in the data network and a destination node in the data network, a set of multiple routes providing a set of shortest routes from the source to the destination that satisfy all the truth assignments for the Boolean algebra available from the path in the network. The method selects, for a packet flow, a route where logical conjunction of the policy constraints of the flow and the route is satisfied and where the route has sufficient bandwidth.

9 Claims, 5 Drawing Sheets

600
computing, for each source node in the data network and each destination node in the data network, a set of multiple routes providing a full range of policy constraints from the source node to the destination node

602
selecting, for a packet originating from a source node and addressed to a destination node, a route selected from the computed set of multiple routes

604
forwarding the packet in accordance with the selected route

Forwarding Description

| a | b | a and b |
|---|---|---|
| False | False | False |
| False | True | False |
| True | False | False |
| True | True | True |

*Fig. 2B*

| a | b | a or b |
|---|---|---|
| False | False | False |
| False | True | True |
| True | False | True |
| True | True | True |

Forwarding Description

| Weight | Boolean Constraint | Next Hop |
|---|---|---|
| (10,5) | [F,F,F,T] | 2 |
| (7,4) | [F,F,F,T] | 5 |
| (5,8) | [F,T,T,T] | 6 |

*Fig. 3*

| a | b | Routes (weight, next hop) |
|---|---|---|
| False | False | -- |
| False | True | (5,8) 6 |
| True | False | (5,8) 6 |
| True | True | (10,5) 2, (7,4) 5, (5, 8) 6 |

600
computing, for each source node in the data network and each destination node in the data network, a set of multiple routes providing a full range of policy constraints from the source node to the destination node

602
selecting, for a packet originating from a source node and addressed to a destination node, a route selected from the computed set of multiple routes

604
forwarding the packet in accordance with the selected route

NETWORK CONGESTION REDUCTION USING BOOLEAN CONSTRAINED MULTIPATH ROUTING

CROSS-REFERENCE TO RELATED APPLICATIONS

This application is a continuation of U.S. patent application Ser. No. 16/794,039 filed Feb. 18, 2020, which is a continuation-in-part of U.S. patent application Ser. No. 16/745,990 filed Jan. 17, 2020, which claims priority from U.S. Provisional Patent Application 62/793,507 filed Jan. 17, 2019, all of which are incorporated herein by reference.

FIELD OF THE INVENTION

This invention relates to communication networks. In particular, the invention relates to routing solutions in data communications networks such as the Internet.

BACKGROUND OF THE INVENTION

The Internet is based on a single-path communications model. This model imposes significant constraints on the ability of the Internet to satisfy the quality-of-service requirements of network applications, and results in significant inefficiencies in the use of network resources that are manifested as congestion. The result has been the need to over-provision Internet-based systems to meet the basic needs of modern communications. With the adoption of the Internet as the converged communication infrastructure for the 21st century, this is clearly not an acceptable long-term solution.

The two basic approaches to packet switching are virtual circuits and datagrams. Both schemes segment messages into limited-size packets, add control information to each packet to accomplish its switching, and rely on statistical multiplexing of the shared communication links. Virtual circuits emulate circuit-switching used in the early telephone network. The virtual-circuit model is connection-oriented in that communication occurs in three phases (path setup, data transfer, and path teardown), routing is done once per flow by the ingress node during path setup, and paths are implemented using label-swap forwarding such that all traffic for a given flow follows the same path through the network.

In contrast, packet switching based on datagrams is a more drastic departure from the circuit-switching model. Datagram switching is connectionless in that there are no phases in the communication process, packets are transmitted when the source host is ready to transmit, routing is computed at every router in the network on an event-driven basis, and the forwarding decision is made on a hop-by-hop basis as packets flow through the network with the result that different packets in a given flow may follow different paths through the network.

The datagram approach to packet switching has a number of strengths. It is robust in the sense that it co-locates the routing process with the state it computes, manifesting a design principle called fate-sharing. This ensures that the failure of any single component of an internet does not invalidate state located elsewhere in the internet, effectively localizing the effects of any failures. The datagram model is efficient and responsive for a couple of reasons. First, by implementing distributed control of forwarding state it requires only simplex communication of topology change events. Second, by assuming a distributed, hop-by-hop routing model, the datagram model enables the use of more efficient and responsive routing algorithms that can operate with partial information regarding the topology of the network.

Virtual-circuit switching is based on a centralized routing model in that routes are computed on-demand, and forwarding is source-specified through the use of path setup techniques. Hence, virtual circuits are less robust than datagrams due to the requirement that the ingress router control remote forwarding state in routers along the paths it has set up. The virtual-circuit model is less efficient and responsive for a couple of reasons. First, by implementing centralized control of forwarding state it requires duplex communication of topology change events: outbound notification of a topology event, and inbound notification of forwarding state changes. Second, by assuming a centralized routing computation the virtual-circuit model requires the use of full-topology routing algorithms to ensure every router can compute optimal paths to any destination in an internet.

The architecture of today's Internet is based on the catenet model of internetworking. In the catenet model, networks are built by the concatenation of disparate networks through the use of routers. The primary goals of the catenet model, and therefore the Internet architecture, were to support packet-switched communication between computers over internets composed of networks based on diverse network technologies, and to encourage the development and integration of new networking technologies into these internets.

To achieve these goals, a simple but powerful variant of the datagram communication model was adopted. Specifically, the Internet routing architecture is based on a best effort communication model in which the "best" path is pre-computed by each router to all destinations (triggered by topology changes), and packets are forwarded on a best effort basis (and may be dropped or delivered out of order in the event of congestion or routing changes). Packet forwarding is implemented on a hop-by-hop basis using destination-address based packet forwarding state computed by the routing process.

This best-effort, distributed, hop-by-hop, datagram routing model has proven surprisingly powerful. Indeed, much of the success of the Internet architecture can be attributed to its routing model. However, largely as a product of its own success, limitations of this model are being encountered as it is applied to more demanding applications.

A significant limitation is the model only supports a single path to each destination. Specifically, Internet forwarding state is composed of a single entry for each destination in an internet giving the next-hop router on the path to the destination. As a result, only one path is supported to any given destination, and that path is computed to optimize a single metric.

Unfortunately, the single-path limitation of the Internet is not adequate for many of the demanding applications to which the Internet is currently being applied, such as the need for routing flows according to desired policies.

In addition, single-path routing results in significant inefficiencies in the use of network resources. With single-path routing, multiple flows can be routed over one or more congested links while other regions of the network are lightly loaded.

In view of the above, there have been attempts to improve support for implementing routing policies as well as the use of multiple paths for congestion control. None of these approaches, however, adequately provide this support while being compatible with the Internet architecture in terms of implementing a datagram communication model (pre-computation of routes and hop-by-hop forwarding).

Two enhancements to the Internet architecture have been proposed representing fundamentally different approaches to solving the problem of resource management in the context of performance requirements, the Intserv and Diffserv architectures.

The goal of the integrated services (Intserv) architecture is to define an integrated Internet service model that supports best-effort, real-time, and controlled link sharing requirements. Intserv makes the assumption that network resources must be explicitly controlled, and defines an architecture where applications reserve the network resources required to implement their functionality, and an infrastructure of admission control, traffic classification, and traffic scheduling mechanisms which implement the reservations. In the Intserv architecture resource reservations are sent along paths computed by the existing routing infrastructure. As a result, requests may be denied when resources do not exist along the current route when in fact paths exist that could satisfy the request. Intserv is based on a virtual-circuit communications model and, as such, has all the limitations of that model relating to robustness, efficiency, and responsiveness discussed above.

In contrast, the differentiated services (Diffserv) architecture provides resource management without the use of explicit reservations. In Diffserv, a small set of per-hop forwarding behaviors (PHBs) is defined within a Diffserv domain which provide resource management services appropriate to a class of application resource requirements. Traffic classifiers are deployed at the edge of a Diffserv domain that classify traffic for one of these PHBs. Inside a Diffserv domain, routing is performed using traditional hop-by-hop, address-based forwarding mechanisms.

Diffserv retains the best-effort, distributed, hop-by-hop, datagram routing model of the Internet, and therefore retains the robustness, efficiency, and responsiveness of the Internet. However, similar to the Intserv model, communications resources to a given flow in a Diffserv environment are limited to those available along the paths computed by the existing routing infrastructure.

In addition, significant research has been done into multipath solutions for QoS and congestion. However, a comprehensive solution that is compatible with the Internet's datagram, hop-by-hop model of communication is still elusive.

Paganini and Mallada ("A unified approach to congestion control and node-based multipath routing." *IEEE/ACM Transactions on Networking*, 17(5):1413-1426, October 2009) present a solution for implementing congestion control in the network layer. The solution computes multiple paths per destination in the routing computation and distributes traffic among these paths in response to a local measure of congestion based on queueing delay. Results are presented from simulations run with a RIP-based implementation of the algorithm. The solution pre-computes paths, and uses hop-by-hop forwarding. However it only addresses congestion control.

In summary, there remains a need for a comprehensive, multipath solution that both supports policies for flows and addresses congestion that is consistent with the Internet architecture's use of pre-computed routes and hop-by-hop forwarding.

BRIEF SUMMARY OF THE INVENTION

This invention provides a solution to the problems of congestion and providing policy-control of the use of network resources for network applications and administrators through the routing of traffic over multiple paths between a given source and destination. These constraints can be defined using a Boolean Algebra where Boolean variables are used to represent policy-relevant properties of network traffic and network state, and Boolean expressions composed of these variables express the constraints required of flows using the network. A set of paths simultaneously provide the full range of policies available in the network.

This set of paths is used to load balance traffic (to avoid congestion) and to select paths for flow requests that meet the policy constraints of the specific flow. These constraints can run from the full range of policies available in a network (e.g. where the application requirements are not known ahead of time or are changing), to a set of specific constraint targets selected to meet the needs of a set of applications.

The policy requirements of a flow are specified in a declarative manner, allowing the network users and administrators to state what performance and policies routes used for a given application should provide without requiring the specification of an exact procedure to be used in selecting appropriate paths. This makes it possible to assign flows to paths that both satisfy the desired policies and minimize congestion. In comparison, existing solutions require a detailed specification of how to compute paths that meet the requirements for a given communication application.

This invention provides a number of potential commercial advantages in the network routing market:

Routes selected that satisfy policy constraints specified by the user and network owner. This supports a number of specific uses:

Service differentiation for network services (e.g. Bronze, Silver, Gold level network access), allowing for increased revenue from existing network infrastructure.

Support for what has been called micro-segmentation, which is a network security model where fine-grained security policies are enforced down to the workload level. This would allow military-style Multi-Level Security (MLS) or, more generally, restriction of traffic to subsets of a network, to be enforced in an Internet environment. Currently micro-segmentation is only implemented in virtualized environments. More broadly, lack of micro-segmentation capabilities in the Internet results in the need to physically implement redundant networks to meet these policy constraints.

The computation of multiple paths to each destination results in the availability of a number of paths that satisfy a given network flow. This provides the opportunity to select the path from these options that minimizes congestion.

The techniques of the present invention use Boolean Constrained Multipath Routing (BCMR) together with BCMR-compatible forwarding techniques. The BCMR algorithm computes the shortest set of routes between each source node and destination node that satisfies the full range of policy constraints possible in the network. This set is used to route flows over paths that satisfy the desired policy constraints on the use of network resources for a given flow.

Policy constraints are specified using Boolean expressions composed of a subset of Boolean variables representing policy-relevant properties of network traffic, network resources, and network state. For each flow request there is a set of Boolean expressions (specifying the policy constraints for the flow) that express the desired policies for routing of traffic for the given flow in the network.

The BCMR algorithm computes, for each truth assignment to the flow's policy constraints, the shortest route from the set of routes where this truth assignment is satisfying for the flow's policy constraints. This set of routes represents a best satisfying set of routes between the source and destination that provide the shortest paths for the full set of truth assignments that are satisfying for the flow constraints. A traffic classification function is then defined for assigning new flows to paths that meet the Boolean constraints relevant for the new flow and have capacity for the new flow, thereby reducing congestion.

The methods of the invention provide a solution to the problems of congestion and providing policy control for network applications through the routing of traffic over multiple paths between a given source and destination. One aspect of the invention is the use of a set of paths that satisfies the full range of policies needed of a network for the applications to be deployed over the network. This set of paths may be used to load balance traffic (to avoid congestion) and to select paths for flow requests that meet the policy requirements of a specific flow. This set of policies can range from the full range of policies supported by a network (e.g., where the application requirements are not known ahead of time or are changing), to a set of specific targets selected to meet the needs of a set of applications (e.g. for the network to be used for military multi-level-security, a set of Boolean constraints would be defined that provide hierarchical security with the common example of unclassified, secret, and top secret security levels).

According to one aspect of the invention, a packet routing method is implemented in a data network by network routing equipment. Preferably, the network is a wired data network and the packets are routed over wired connections between network routers. The method includes computing, for each source node in the data network and each destination node in the data network, a set of multiple routes providing the shortest paths for a full range of policies from the source node to the destination node. The multiple routes are preferably precomputed and stored. The full range of policies is defined by a set of best satisfying routes, which are defined as follows. Given a flow request, for each route from the source node to the destination node there is a set of Boolean constraints that define the policy requirements for the given flow to use that path, and truth assignments (the flow request truth assignment) to some subset of the Boolean variables contained in this set of Boolean constraints. Each of the shortest satisfying routes is defined as the shortest route for a truth assignment that satisfies the Boolean constraints in the context of the flow request truth assignment.

The method also includes selecting, for a packet originating from a source node and addressed to a destination node, a route from the computed set of multiple routes, where the selecting comprises i) determining the Boolean constraints for the packet based on traffic classification rules, and ii) selecting the route that minimizes network congestion and satisfies the Boolean constraint requirements for the packet. The method also includes forwarding the packet in accordance with the selected route.

The selecting may include determining Boolean constraints for the packet based on traffic classification rules specified in terms of contents of the packet, in terms of a user associated with the packet, in terms of a port the packet arrives on, or in terms of one or more other environmental factors.

The method may be implemented in the data network by performing all steps of the method at a single network router device. The method may also be implemented in the data network by performing the computing and the selecting steps at a central network controller device, and performing the forwarding step at a network router device. This implementation corresponds to a "software-defined networking" approach, a popular example being "OpenFlow". The method may also be implemented in the data network by performing the computing at a central network controller device, and performing the selecting and forwarding steps at a network router device.

In some embodiments, selecting the route may include, if a label-swap tag is not present in the packet, computing the label-swap tag from traffic classification rules specified in terms of contents of the packet, in terms of a user associated with the packet, in terms of a port the packet arrives on, or in terms of one or more other environmental factors. If a label-swap tag is already present in the packet, the forwarding may include forwarding the packet based on the label-swap tag in the packet.

In some embodiments, selecting the route may include, if a source route is not present in the packet, computing the source route from traffic classification rules specified in terms of contents of the packet, in terms of a user associated with the packet, in terms of a port the packet arrives on, or in terms of one or more other environmental factors. If a source route is already present in the packet, the forwarding may include forwarding the packet based on the source route in the packet.

In some embodiments, selecting the route may include, if a segment list is not present in the packet, computing the segment list from traffic classification rules specified in terms of contents of the packet, in terms of a user associated with the packet, in terms of a port the packet arrives on, or in terms of one or more other environmental factors. If a segment list is already present in the packet, the forwarding may include forwarding the packet based on the segment list in the packet.

In some embodiments, selecting the route may include performing network load balancing among the computed set of multiple routes.

In addition, in another embodiment, selecting the set of routes may select the dominant set of routes for each satisfying truth assignment, or may select a set of routes that meets specific performance needs of a predetermined set of applications that are to be deployed over the network. This targeted or customized routing model can be valuable in some circumstances (e.g., to reduce the overhead costs of this kind of routing). In general, the method may compute routes with the full range of performance requirements for a satisfying truth assignment when the application mix is not known ahead of time or is continually changing, and the method may compute routes using targeted routing for each satisfying truth assignment when the application mix is fixed or predetermined and efficiency is important.

DETAILED DESCRIPTION OF THE INVENTION

Internet routing is based on use of the best path to a given destination. This best-path model limits communication applications to the use of a single-path in an Internet environment. Furthermore, the predominant use of destination-based forwarding in the Internet is a particularly aggressive form of single-path communication. With destination-based forwarding, the path used to carry traffic through an intermediate node to a destination must be an extension of the path from the intermediate node to the destination. This strong tendency for traffic to be concentrated on a subset of available paths results in inefficient use of network resources with traffic experiencing congestion while network resources are still idle. Modern use of the Internet involves a wide range of applications with diverse requirements in terms of policy constraints. The diverse requirements of these applications are not well served by the existing Internet routing architecture. What is needed is an architecture that makes use of a set of paths between each source and destination that support the full range of policies available in a network.

This disclosure provides a solution to the problems of congestion and providing policy-control of the use of network resources for network applications and administrators through the routing of traffic over multiple paths between a given source and destination. An example of this policy control relating to the use of a network in a military context where paths are rated as to the level of sensitivity of content they can carry (e.g. TOP-SECRET, SECRET, UNCLASSIFIED). One path that traverses links that provide a high level of security (e.g. fiber optic links, which are difficult to tap, in secured facilities, wireless links using strong encryption protocols where the end-points are in secured facilities, etc.) would be rated to carry TOP-SECRET traffic, while another path composed only of relatively unsecured links (e.g. a path over the public Internet) would be rated to only carry UNCLASSIFIED traffic. In the abstract these paths are not comparable. However, in the context of a specific use, one will generally be clearly preferred over the other (e.g. sensitive military operational traffic would require the TOP-SECRET path while general web browsing could make use of the UNCLASSIFIED path).

These constraints can be defined using a Boolean Algebra where Boolean variables are used to represent policy-relevant properties of network traffic and network state, and Boolean expressions composed of these variables express the policy constraints required of flows using the network.

The techniques use a Boolean algebra to define and compute the set of paths in a network that satisfy constraints defined using the Boolean algebra. U.S. Pat. No. 9,197,544, which is incorporated herein by reference, discusses the use of a path algebra in the context of dominant path routing instead of a Boolean algebra for Boolean constrained routing.

A Boolean algebra can be used in a "General-Policy-Based Dijkstra" algorithm to compute the set of paths that simultaneously provide the full range of policies (in terms of the Boolean constraints) available in the network.

This disclosure provides for the computation of routes subject to Boolean constraints expressing policies, and the use of these paths subject to congestion reduction. This disclosure also provides a forwarding technique based on the routing.

A flow is defined as a sequence of packets that satisfy the same set of constraints (either Boolean only or both Boolean and performance) and are therefore subject to the same set of policies. The term flow in the present context is not related to IPv6, and, actually, is independent of any specific protocol.

One path value (x) is said to dominate another (y) where the set of truth assignments where y is true is a subset of the truth assignments where x is true (in their truth tables). So the Boolean expression x satisfies more truth assignments than y. For a network example, if we have a shorter path A with path value Boolean expression y and a longer path B with Boolean expression x, we are going to want to include route B in our routing tables because, even though it is longer, if it satisfies some potential truth assignments that the shorter route A does not satisfy.

In the dominant set multipath routing (DSMR) patent (U.S. Pat. No. 9,197,544) dominance in DSMR is defined differently, as follows: "The full range of performance is defined by a set of dominant routes, where each route from the source node to the destination node in the data network has multiple distinct performance metrics defining coordinates of a corresponding point in a multi-dimensional space. The multiple distinct performance metrics defining coordinates of the multi-dimensional space may include, for example, metrics such as a bandwidth metric, a latency metric, a jitter metric, and a reliability metric. Each of the dominant routes is defined as a route that has a corresponding point in the multi-dimensional space that is maximal with respect to a partial order defined on points in the multi-dimensional space corresponding to routes from the source node to the destination node."

For BCMR dominance is defined very differently. A Boolean expression can be described using a truth table with one column for each Boolean variable in the expression, and a final column for the Boolean expression. Each row contains a truth assignment of the values of either True or False to each variable (so, for n variables there will be $2^n$ rows), and the expression column shows the value of the expression given the truth assignments to the variables in that row.

Figure 6:
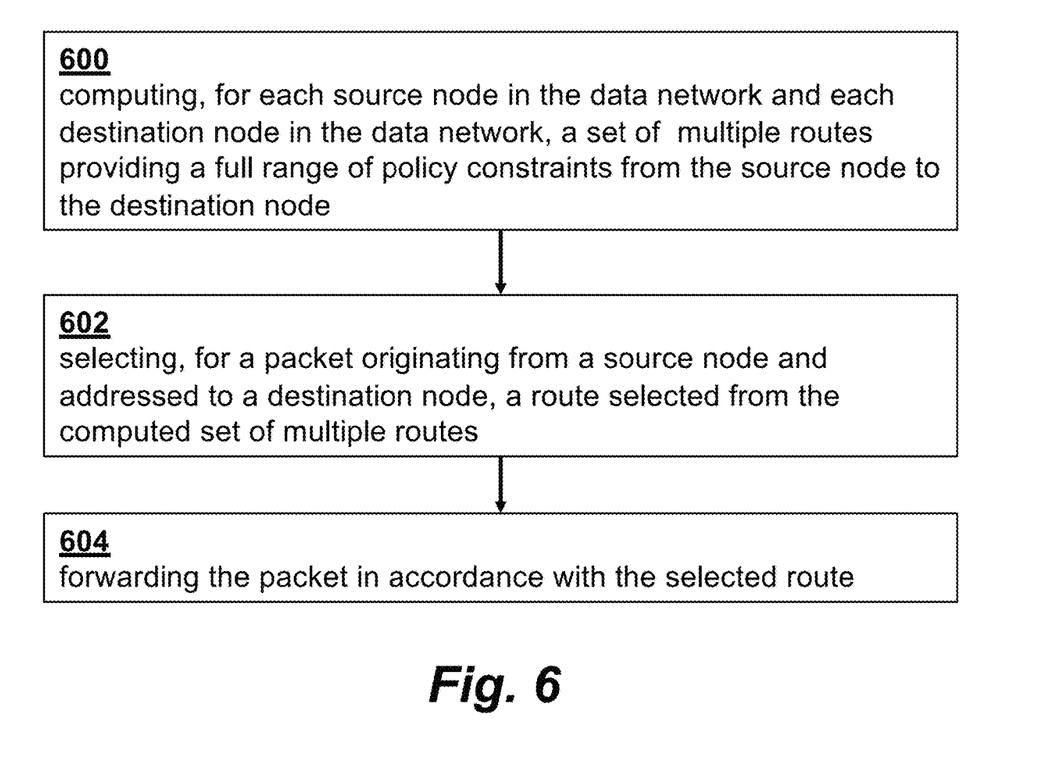
FIG. 6 is an outline of the steps of a method for packet routing according to one embodiment of the invention.

FIG. 6 is an outline of the steps of a method for packet routing according to one embodiment of the invention. In step 600 the network equipment computes, for each source node in the data network and each destination node in the data network, a set of multiple routes providing a full range of performance from the source node to the destination node. The details of this step will be described in more detail below. In step 602, the network equipment selects, for a packet (or flow) originating from a source node and addressed to a destination node, a route selected from the set of multiple routes computed in step 600. The path selection may be implemented, for example, using an oracle that always assigns flows to paths that both satisfy the flow's QoS requirements and have adequate available bandwidth for the new flow. In step 604, the network equipment forwards the packet in accordance with the route selected in step 602.

Figure 7:
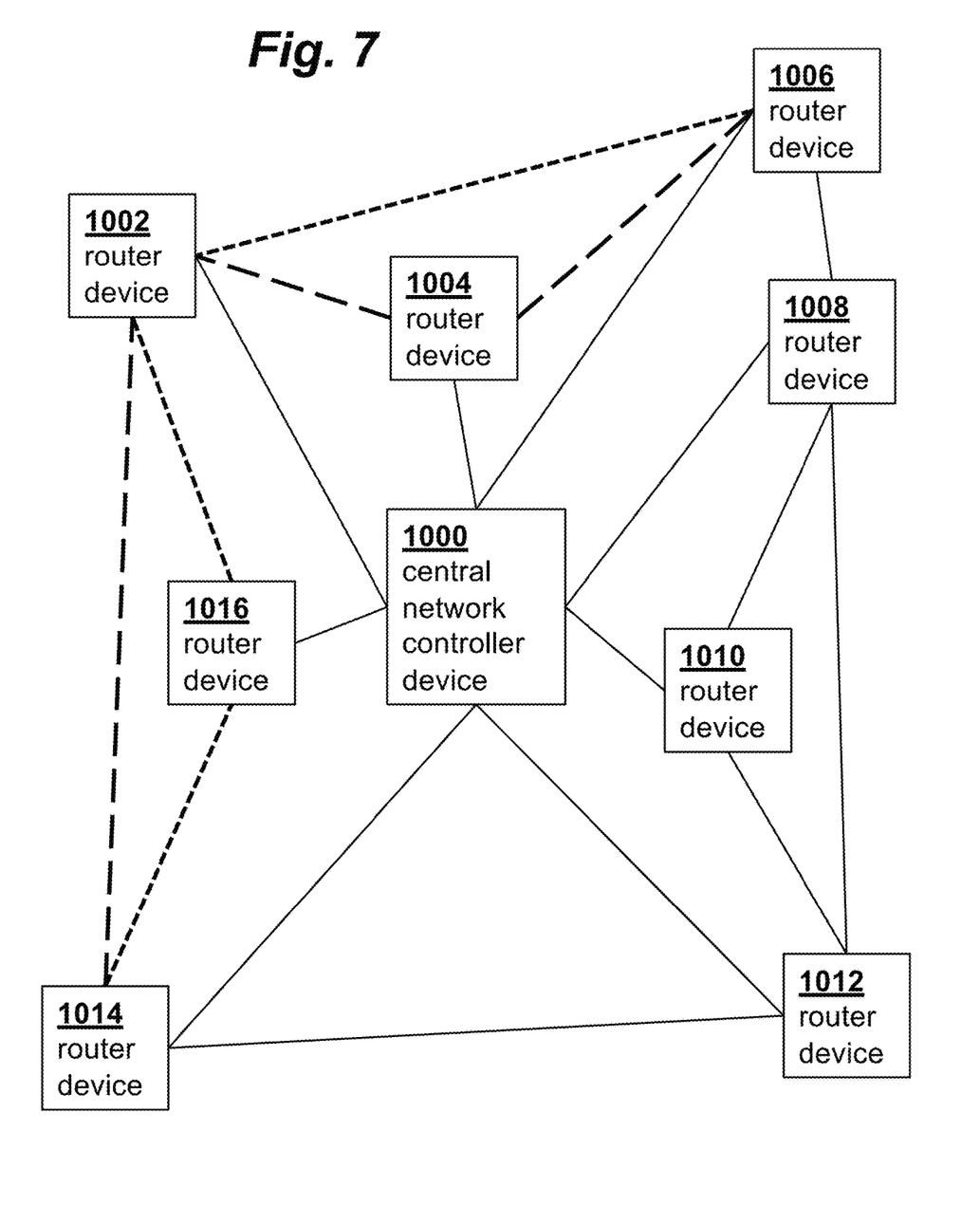
FIG. 7 is a schematic diagram illustrating a portion of a network including multiple router devices and a central network controller device, according to one embodiment of the invention.

FIG. 7 is a schematic diagram illustrating a portion of a network including multiple router devices 1002-1016 and a central network controller device 1000, according to one embodiment of the invention. The dashed lines indicate two alternate routes between device 1006 and device 1014. One route, indicated by a short dashed line, passes through intermediate devices 1002 and 1016. Another route, indicated by a long dashed line, passes through intermediate devices 1004 and 1002. These two routes might, for example, represent the multiple routes providing a full range of policies from source node 1006 to destination node 1014.

The router devices 1002-1016 may be conventional routers with standard forwarding technologies integrated into these routers and their software, modified to implement the techniques of the present invention. In some embodiments, the computing of the multiple paths, the selecting of a route, and the forwarding steps are all performed by each of the router devices 1002-1016. In these embodiments, the central controller 1000 is not necessary and may be eliminated. In other embodiments, compatible with "Open Flow" approaches to routing, the central controller 1000 computes the multiple routes. This precomputed routing information is then transmitted to each router device. For example, controller 1000 may compute the multiple routes from router 1006 to router 1014, then remotely updates the forwarding states of routers as appropriate. Each router with a packet to forward then independently selects a route from the multiple routes and forwards the packet over the selected route. This embodiment might be particularly useful in the case of a small or medium internet service provider (ISP), or organizations such as universities or larger corporations. In yet another embodiment, the central controller node 1000 not only computes the multiple routes, but also selects routes. For example, a router 1006 may query the central controller 1000 as needed to determine a route to forward a packet over. The central controller 1000 selects a route from the multiple routes and informs the router of the selection as a response to the query. In this embodiment, it is not necessary for central network controller to transmit computed multiple route forwarding information to the router devices. Allowing the central controller to select routes allows more intelligent congestion control in the network, but may increase latency.

We now discuss an algorithm, according to one embodiment of the invention, for computing a set of routes in a network that provide a full range of performance from a source node to a destination node. This algorithm is preferably precomputed, i.e., in advance of any particular packet or flow being transmitted onto the network rather than computed on-demand with each new packet or flow.

Figure 5:
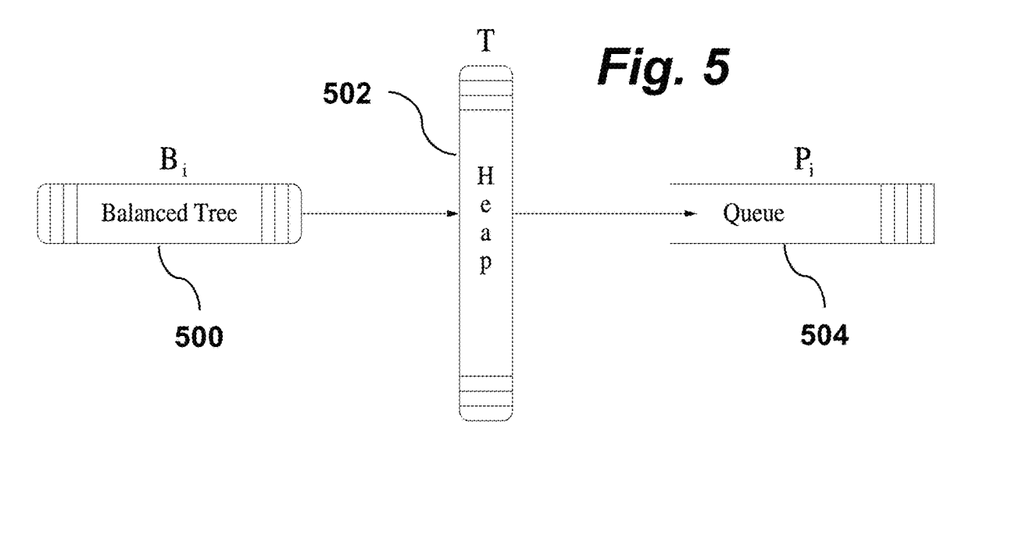
FIG. 5 is a schematic diagram illustrating data structures used by a routing method according to an embodiment of the present invention.

The routing algorithm is based on the data structure model shown in FIG. 5. In this structure, a balanced tree 500 (Bi) is maintained for each node in the graph to hold newly discovered, temporary labeled routes for that node. The heap 502 T contains the lightest weight entry from each non-empty Bi (for a maximum of n entries). A queue 504 Pi is maintained for each node which contains the set of permanently labeled routes discovered by the algorithm, in the order in which they are discovered (which will be in increasing weight).

Figure 8:
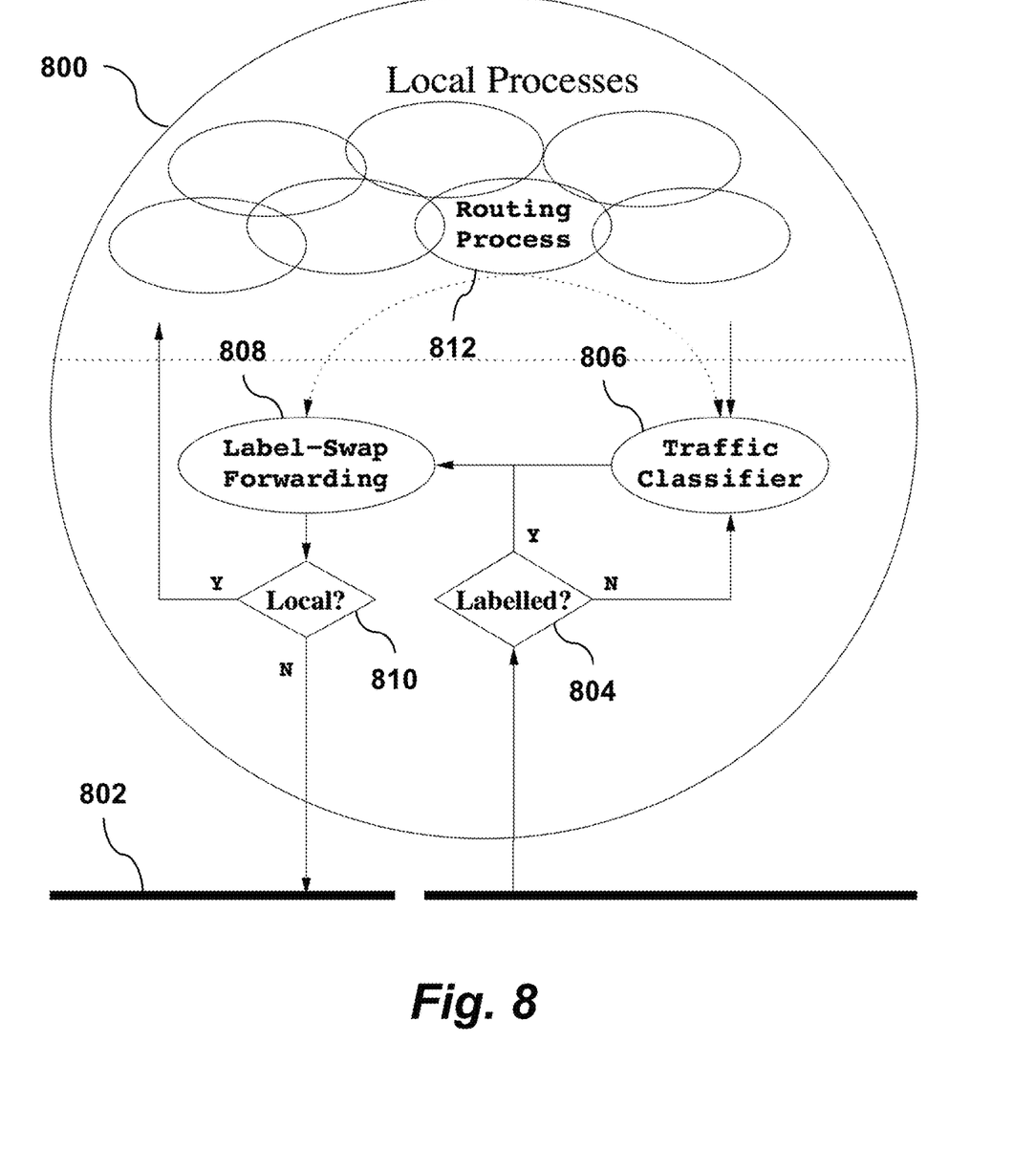
FIG. 8 is a schematic diagram illustrating classification of traffic flows in a network router device according to an embodiment of the present invention.

After multiple routes are computed, they are used for routing flows. For a given flow having a policy constraint specified by a Boolean expression, a route is selected from the set of multiple routes such that the route satisfies the policy constraints for the flow. The packets of the flow are forwarded in accordance with the selected route. Performing traffic classification at each hop in the network would be prohibitively expensive. To avoid this, preferred embodiments use label-swap forwarding so that only the first router that handles a packet needs to perform a traffic classification before forwarding it. Accordingly, the forwarding state of a router is enhanced to include local and next hop forwarding label information, in addition to the destination and next hop information existing in traditional forwarding tables, as shown in the table for node W. Traffic classifiers are placed at the edge of an internet, where "edge" is defined to be any point from which traffic can be injected into the internet. FIG. 8 illustrates schematically aspects of packet processing by a router device 800 connected to an internet subnet 802 according to one embodiment of the invention. The packet processing includes checking if a packet is labelled 804. If it is not, applying a traffic classifier 806. Then, label-swap forwarding 808 is applied and if the packet is not local, it is forwarded back onto the subnet 802. A routing process 812 informs the label-swap forwarding 808 and traffic classifier 806.

To date, label-swapping has been used in the context of connection-oriented (virtual circuit) packet forwarding architectures. In these applications, a connection setup phase establishes the labels that routers should use to forward packets carrying such labels, and a label refers to an active source-destination connection. Also known is the technique of threaded indices, in which neighboring routers share labels corresponding to indexes into their routing tables for routing-table entries for destinations, and such labels are included in packet headers to allow rapid forwarding-table lookups. The forwarding labels according to embodiments of the present invention are similar in some aspects to threaded indices. A label is assigned to each routing-table entry, and each routing-table entry corresponds to a policy-based route maintained for a given destination. Consequently, for each destination, a router exchanges one or multiple labels with its neighbors. Each label assigned to a destination corresponds to the set of service classes satisfied by the route identified by the label.

The forwarding architecture according to embodiments of the present invention may be implemented, for example, using the downstream tag allocation method described in Cisco's Tag Switching Architecture. In downstream tag allocation, routers allocate tags as a part of the routing computation, assigning a tag to each forwarding table entry. The binding of these tags with routes is then advertised to adjacent routers that support tag switching. Routers can use the tag information to construct their own Tag Information Base, which is used for label-swap forwarding.

In addition to BCMR being implemented with labels, it can be implemented with source routing in general, and segment routing in particular. In some embodiments, selecting the route may include, if a source route is not present in the packet, computing the source route from traffic classification rules specified in terms of contents of the packet, in terms of a user associated with the packet, in terms of a port the packet arrives on, or in terms of one or more other environmental factors. If a source route is already present in the packet, the forwarding may include forwarding the packet based on the source route in the packet.

In some embodiments, selecting the route may include, if a segment list is not present in the packet, computing the segment list from traffic classification rules specified in terms of contents of the packet, in terms of a user associated with the packet, in terms of a port the packet arrives on, or in terms of one or more other environmental factors. If a segment list is already present in the packet, the forwarding may include forwarding the packet based on the segment list in the packet.

We now discuss in more detail the Boolean Constrained Multipath Routing (BCMR) algorithms. Table 1 defines the notation used in these algorithms, and Table 2 defines the primitive operations for queues, heaps, and balanced trees used in the algorithms, and gives their time complexity used in their complexity analysis. Algorithm 1 is a listing of a modified Dijkstra algorithm that computes the set of shortest routes to each destination that satisfies all truth assignments for the Boolean algebra available from a path in the network. Algorithm 2 extends the BCMR algorithm to compute the maximal set of routes for each satisfiable truth assignment in the network.

The SAT($\varphi$) primitive of the traffic algebra is the satisfiability problem of traditional Boolean algebra. SAT answers the question "is there an assignment of truth values to the propositional variables in $\varphi$ such that $\varphi$ evaluates to true?" The SAT($\varphi$) primitive evaluates to 1 (true) if such a truth assignment exists, and 0 (false) otherwise. Satisfiability must be tested in two situations by the algorithms presented below. First, when a new route to a destination is considered for comparison to an existing route for the same destination (e.g. lines 5 and 13 in Algorithm 1), they should only be compared if classes of traffic exist that can use either route. Therefore, new routes are only compared with existing routes when the conjunction of their path predicates is satisfiable. Second, given that classes of traffic exist that can use either path, the algorithms must determine whether all traffic supported by one path could use the other. This is the case if the path predicate for one path implies ("$\rightarrow$") the other or, more precisely, if the expression ($\varepsilon_x \rightarrow \varepsilon_y$) is always true (i.e. is valid). Determining if an expression is valid is equivalent to determining if the negation of the expression is unsatisfiable. Therefore the expressions at lines 10 and 13, of the form $\varepsilon_1 \rightarrow \varepsilon_2$ are equivalent to $\neg SAT(\neg(\varepsilon_1 \rightarrow \varepsilon_2))$ (or $\neg SAT(\varepsilon_1 \wedge \varepsilon_2)$). The satisfiability decision performed by SAT($\varepsilon$) is the prototypical NP-complete problem. As is typical with NP-complete problems, it has many restricted versions that are computable in polynomial time.

In the DSMR elements of Algorithm 2, path weights are composed of multi-component metrics that capture all important performance measures of a link such as delay, delay variance ("jitter"), available bandwidth, etc. The best set of paths to a destination is defined using an enhanced version of the path algebra defined by Sobrinho (*IEEE/ACM Transactions on Networking*, 10(4):541-550, August 2002).

Formally, the path algebra $P=<W, \oplus, \preccurlyeq, \subseteq, 0, \infty>$ is defined as a set of weights W, with a binary operator $\oplus$, and two order relations, $\preccurlyeq$ and $\subseteq$ defined on W. There are two distinguished weights in W, 0 and $\infty$, representing the least and absorptive elements of W, respectively. Operator $\oplus$ is the original path composition operator, and relation $\preccurlyeq$ is the original total ordering of Sobrinho, which is used to order the paths for traversal by the path selection algorithm. Operator $\oplus$ is used to compute path weights from link weights. The routing algorithm uses relation $\preccurlyeq$ to build the forwarding set, starting with the minimal element, and by the forwarding process to select the minimal element of the forwarding set whose parameters satisfy a given QoS request. A new relation on routes, $\subseteq$, is added to the algebra and used to define classes of comparable routes and select maximal elements of these classes for inclusion in the set of forwarding entries for a given destination. Relation $\subseteq$ is a partial ordering (reflexive, anti-symmetric, and transitive) with the following, additional property:

Property 1($\omega_x \subseteq \omega_y$) $\Rightarrow$ ($\omega_x \succcurlyeq \omega_y$).

An example path algebra based on weights composed of delay and bottleneck bandwidth is as follows:

$\omega_i \equiv (d_i, b_i)$ $0 \equiv (0, \infty)$ $\infty \equiv (\infty, 0)$ $\omega_i \oplus \omega_j \equiv (d_i + d_j, Min(b_i, b_j))$ $\omega_i \preccurlyeq \omega_j \equiv (d_i < d_j) \vee ((d_i = d_j) \wedge (b_i \leq b_j))$ $\omega_i \subseteq \omega_j \equiv (d_j \leq d_i) \wedge (b_j \geq b_i)$

TABLE 1

Notation.

A(i) ≡ Set of edges adjacent to i in the graph.
$\omega_{ij}$ ≡ Weight of edge (i, j).
$\varepsilon_{ij}$ ≡ Link predicate of edge (i, j).
P ≡ Queue of permanent routes to all nodes.
$P_n$ ≡ Queue of permanent routes to node n.
T ≡ Heap of temporary routes.
$T_n$ ≡ Entry in T for node n.
$B_n$ ≡ Balanced tree of routes for node n.
$E_n$ ≡ Summary of traffic expression for all routes in $P_n$.

TABLE 2

Operations on Data Structures.

| Queue | |
|---|---|
| Push(r, Q) | Insert record r at tail of queue Q |
| Head(Q) | Return record at head of queue Q |
| Pop(Q) | Delete record at head of queue Q |
| PopTail(Q) | Delete record at tail of queue Q |
| d-Heap | |
| Insert(r, H) | Insert record r in heap H |
| IncreaseKey(r, $r_h$) | Replace record $r_h$ in heap with record r having greater key value |
| DecreaseKey(r, $r_h$) | Replace record $r_h$ in heap with record r having lesser key value |
| Min(H) | Return record in heap H with smallest key value |
| DeleteMin(H) | Delete record in heap H with smallest key value |
| Delete($r_h$) | Delete record $r_h$ from heap |
| Balanced Tree | |
| Insert(r, B) | Insert record r in tree B |
| Min(B) | Return record in tree B with smallest key value |
| DeleteMin(B) | Delete record in tree B with smallest key value |

Algorithm 1: Modified Dijkstra SPF algorithm for BCMR.

```
algorithm BCMR
begin
Push(<s,s,0,1>, Ps);
for each {(s, j ) ∈ A(s)}
    Insert(<j,s,ω_sj,ε_sj >, T);
while(|T| >0)
    begin
    >i,p_i,ω_i,ε_i > ← Min(T);
    DeleteMin(B_i);
```

-continued

Algorithm 1: Modified Dijkstra SPF algorithm for BCMR.

```
if(|B_i| = 0)
    then DeleteMin(T )
    else IncreaseKey(Min(B_i), T_i);
if (¬ (ε_i → E_i))
    then begin
        Push(<i,p_i,ω_i,ε_i >, P_i);
        E_i ← Ei∨εi;
        for each {(i,j) ∈ A(i) | SAT(ε_i ∧ε_ij) ∧ ¬((ε_i ∧ε_ij) → E_j)}
            begin
                ω_j ← ω_i + ω_ij; ε_j ← ε_i ∧ε_ij;
                if (Tj = ∅)
                    then Insert(<j,i,ω_j,ε_j >, T)
                    else if (ω_j < T_j.ω)
                        then DecreaseKey(<j,i,ω_j,ε_j >, T);
                Insert(<j,i,ω_j,ε_j >, B_j);
            end
        end
    end
end
```

Algorithm 2: Modified Dijkstra SPF algorithm
for combined DSMR & BCMR.

```
algorithm Combined DSMR & BCMR
begin
Push(<s,s,0,1>, P_s);
for each {(s, j ) ∈ A(s)}
    Insert(<j,s,ω_sj,ε_sj >, T);
while(|T| >0)
    begin
        <i,p_i,ω_i,ε_i > ← Min(T);
        DeleteMin(B_i);
        if(|B_i| = 0)
            then DeleteMin(T )
            else IncreaseKey(Min(B_i), T_i);
        ε_tmp ← ε_i; ptr ← Tail(P_i);
        while ((ε_tmp/= 0) ∧ (ptr/= ∅))
            if (wi ⊑ ptr.ω)
                ε_tmp ← ε_tmp ∧ ¬ptr.ε; ptr ← ptr.next;
        if(ε_tmp ≠0)
            then begin
                Push(<i,p_i,ω_i,ε_i > P_i);
                for each{(i,j) ∈ A(i) | SAT(ε_tmp ∧ε_ij)}
                    begin
                        ω_j ← ω_i ⊕ω_ij; ε_j ← ε_tmp∧εij;
                        if (T_j = ∅)
                            then Insert(<j,i,ω_j,ε_j >, T)
                            else if (ω_j < T_j.ω)
                                then DecreaseKey(<j,i,ω_j,ε_j >, T);
                        Insert(<j,i,ω_j,ε_j >, B_j);
                    end
                end
            end
        end
    end
end
```

Dijkstra is not needed but just an example of a method that could be used to reach all nodes. Others include Bellman Ford and any other shortest path routing algorithms. Need not be limited to shortest path first specifically, but those work.

Figure 1:
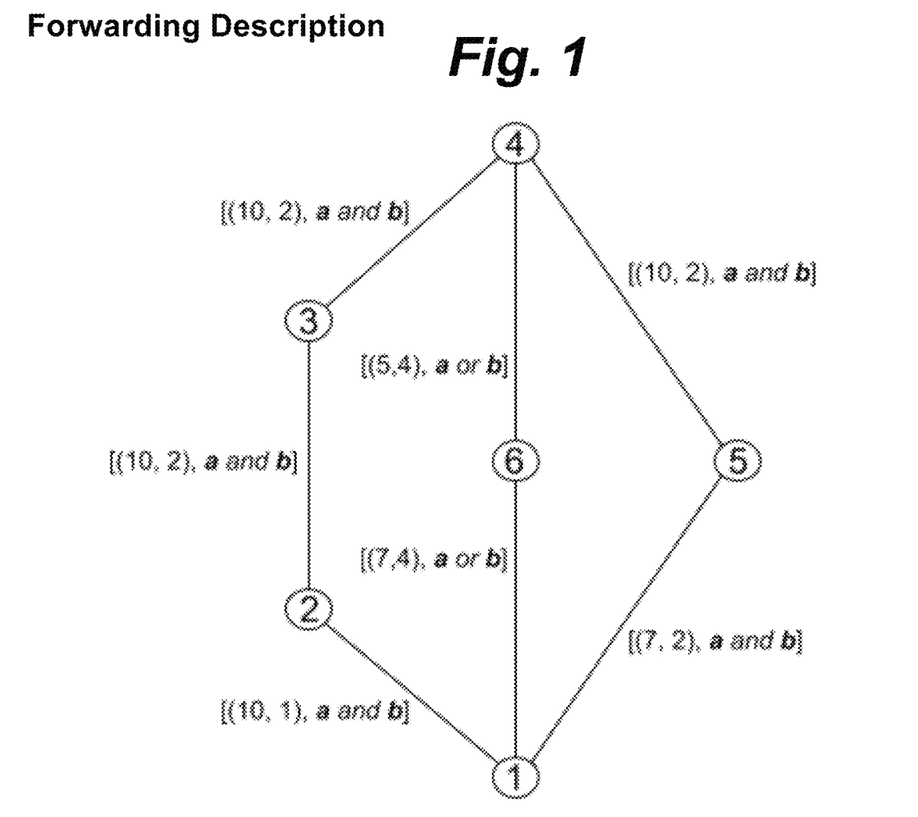
FIG. 1 shows a part of a network where the number of hops between routing devices varies and where each device does or does not satisfy a particular Boolean test. Routing based on just one Boolean test per device will not be suitable for all application types.
Figure 2A:
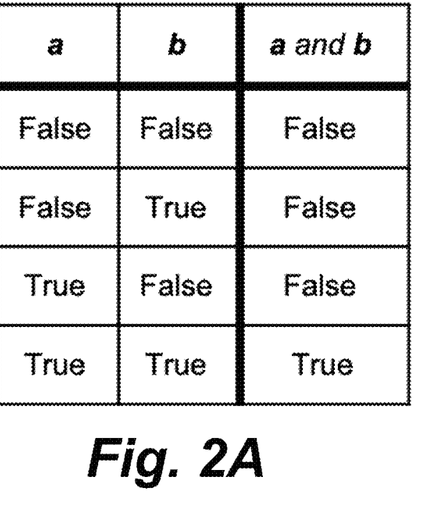
FIGS. 2A and 2B show a pair of truth tables corresponding to FIG. 1.
Figure 2B:
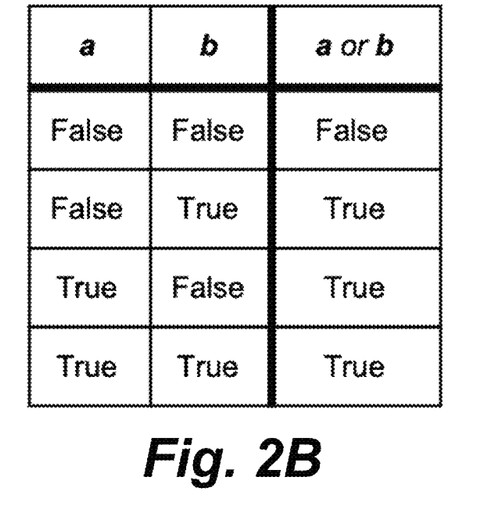

In the graph shown in FIG. 1 paths (1,2,3,4) and (1,5,4) have Boolean constraint "a and b" with truth table shown in FIG. 2A, while path (1,6,4) has constraint "a or b" with truth table shown in FIG. 2B.

Figure 3:
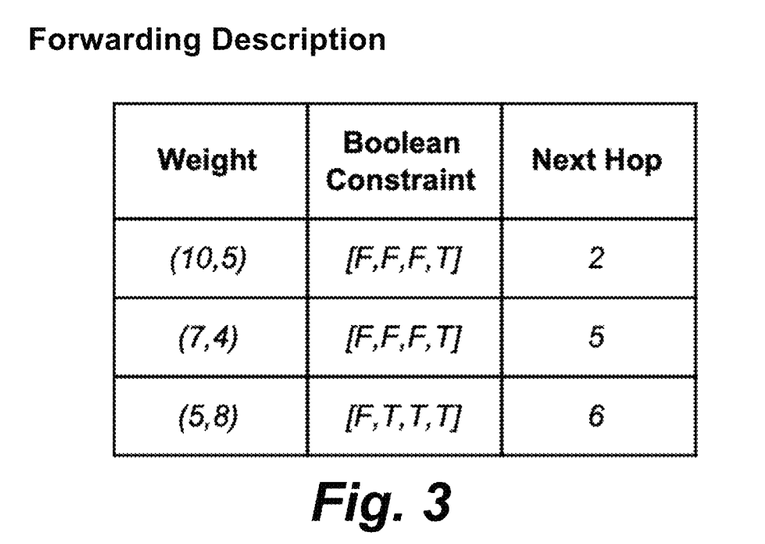
FIG. 3 shows routing table entries computed for a BCMR routing algorithm.

Given these paths the combined DSMR and BCMR routing algorithm would compute the routing table entries from node 1 to node 4 (where the weights are (bandwidth, delay) shown in FIG. 3 and the path algebra is Shortest-Widest.

Figure 4:
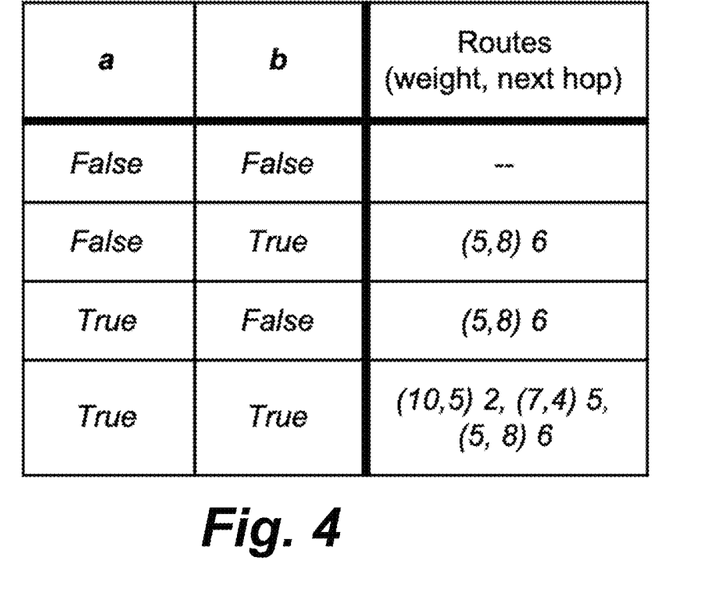
FIG. 4 shows for different routes the truth assignments to variables in Boolean constraints of FIG. 3.

In this table the list in the Boolean Constraint column is a shorthand version of the truth tables shown above. Specifically 'F' and 'T' represent False and True, and each entry in the list represents the corresponding entry in the table (so the first entry in the list is the value for a=False and b=False, the second entry is for a=False and b=True, etc.). These entries are to be interpreted in terms of a (logically) distinct table for each truth assignment to the variables used in the constraints. This interpretation can be visualized as shown in FIG. 4.

As an example, a flow with the constraint "not a and b" (and thus the truth table [T,T,F,T]) can use routes for any of the satisfying truth assignments of a and b; i.e. for the truth assignments evaluating to True in the flow constraints truth tables, or [a=F, b=F], [F,T], [T,T]. Entries in the Routes column are in the format "(bandwidth, delay) next hop". Translating this to usable routes, this flow can use any of the available paths. Concretely, the entry for [a=F, b=F] is empty ('—'), for [F,T] is "(5,8) 6", and for [T,T] is "(10,5) 2, (7,4) 5" for the following list of usable routes:

(10,5) 2, (7,4) 5, (5,8) 6

However, given there are $2^n$ rows in such a truth assignment table (i.e. 2 routing tables to search for a given flow constraint), where n is the number of constraint variables, this approach to forwarding table lookups is prohibitively expensive. Fortunately an alternative solution is suggested by the observation that the set of usable routes for a given flow are those where the performance constraint is satisfied, and both the routing table constraint and the flow constraint evaluate to True. This is exactly the set of routing table entries where the performance constraint is satisfied (i.e. if $RT_{pc}$ is the routing table performance constraint ad $F_{pc}$ is the flow performance constraint, the entries where "$F_{pc} \subseteq RT_{pc}$"), and the conjunction of the routing table constraint and the flow constraint is satisfiable; i.e., if $RT_{bc}$ is the routing table constraint ("Boolean Constraint" in the routing table above) and $F_{bc}$ is the flow performance constraint (the truth table [T,T,F,T] representing the constraint "not a and b" above), the set of usable routes are those where SAT("$RT_{bc}$ and Fbc") (SAT( ) is the standard Boolean Satisfiability function) is True.

This is concisely described in the following pseudo-code (where $R_d$ is the set of routes computed for destination d containing routes of the form <dest, next hop, forwarding information, performance constraint, Boolean constraint>; forwarding information is the information used to forward the traffic, such as label swap information):

```
algorithm ForwardingSet( R_d, F_pc, F_bc )
begin
FS ← { }; // The computed forwarding set.
for each { <d,nh,fi,pc,bc> ∈ R_d }
    if ( F_pc ⊑ RT_pc and SAT( RT_bc and F_bc))
        then Append ( <d, nh, fi>, FS )
return ( FS)
end
```

This algorithm provides an efficient, single pass solution for identifying candidate paths for the flow. The returned set of routes are those that satisfy the constraints; one of these can be selected based on other criteria, such as minimal congestion for use by the given flow.

The invention claimed is:

1. A method of routing traffic within a data network by network routing equipment, the network comprising a set of policy constraints, the method comprising:
   a) identifying from a flow, a set of flow-specific constraints;

b) computing a best set of routes from a source node to a destination node in the network, wherein the routes in the best set of routes satisfy the entire set of policy constraints in the network;

c) selecting a subset from the best set of routes wherein the subset comprises routes that meet the set of flow-specific constraints;

d) selecting a least congested route from the subset, where the policy constraint comprises a Boolean constraint; and where the Boolean constraint comprises a selected internet protocol field, a selected network zone, a selected user identification, a selected operating system, a selected application, a selected facility or user security clearance, a selected level of content sensitivity, selected physical layer attributes, a selected time, or a selected threat level.

2. The method of claim 1 where the set of policy constraints comprises a performance constraint.

3. The method of claim 2 where the performance constraint comprises a selected hop count, a selected delay, a selected bandwidth, or a selected reliability.

4. The method of claim 1 where the flow specific constraint comprises a performance constraint.

5. The method of claim 4 where the performance constraint comprises a selected hop count, a selected delay, a selected bandwidth, or a selected reliability.

6. The method of claim 1 where the flow specific constraint comprises a Boolean constraint.

7. The method of claim 6 where the Boolean constraint comprises a selected internet protocol field, a selected network zone, a selected user identification, a selected operating system, a selected application, a selected facility or user security clearance, a selected level of content sensitivity, selected physical layer attributes, a selected time, or a selected threat level.

8. The method of claim 1 where one or both of the set of policy constraints and the flow-specific constraints can be selected by a network user or administrator.

9. A method of routing traffic within a data network by network routing equipment, the network comprising a set of policy constraints, the method comprising:

a) identifying from a flow, a set of flow-specific constraints;

b) computing a best set of routes from a source node to a destination node in the network, wherein the routes in the best set of routes satisfy the entire set of policy constraints in the network;

c) selecting a subset from the best set of routes wherein the subset comprises routes that meet the set of flow-specific constraints;

d) selecting a least congested route from the subset;

where the flow specific constraint comprises a Boolean constraint; and where the Boolean constraint comprises a selected internet protocol field, a selected network zone, a selected user identification, a selected operating system, a selected application, a selected facility or user security clearance, a selected level of content sensitivity, selected physical layer attributes, a selected time, or a selected threat level.

\* \* \* \* \*